April 29, 1969 — G. P. KELLEY — 3,440,673
DOCKBOARD
Filed Feb. 15, 1968 — Sheet 1 of 2
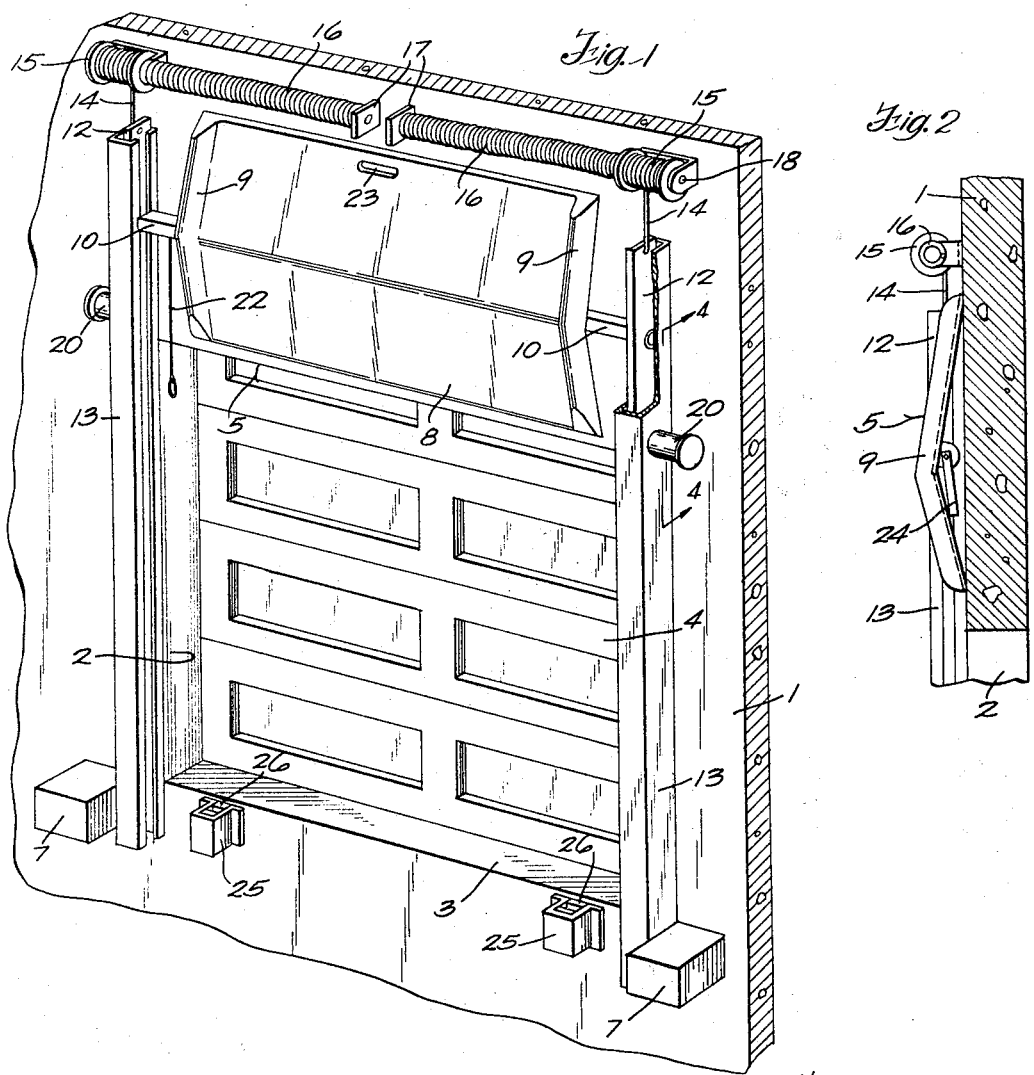
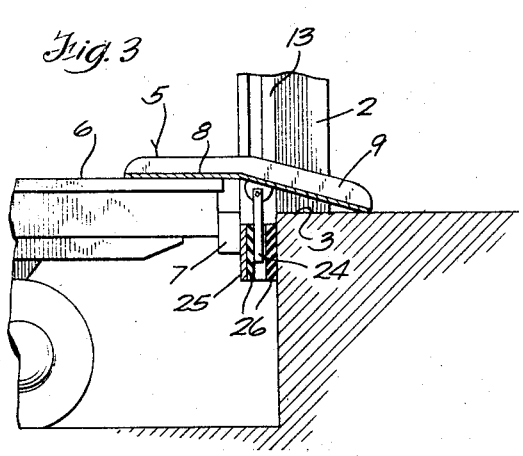
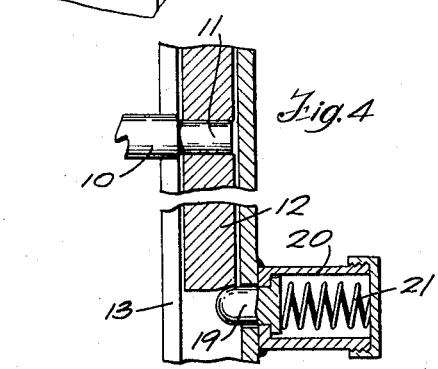
Inventor
Garrett P. Kelley
By Andrus & Starke
Attorneys April 29, 1969 G. P. KELLEY 3,440,673
DOCKBOARD
Filed Feb. 15, 1968

Inventor
Garrett P. Kelley
By Andrus & Starke
Attorneys

United States Patent Office 3,440,673
Patented Apr. 29, 1969

3,440,673
DOCKBOARD
Garrett P. Kelley, Milwaukee, Wis., assignor to Kelley Company, Inc., a corporation of Wisconsin
Filed Feb. 15, 1968, Ser. No. 705,776
Int. Cl. B65g 11/12, 67/02
U.S. Cl. 14—71                                     10 Claims

ABSTRACT OF THE DISCLOSURE

This invention relates to a dockboard which is adapted to be stored vertically above dock level. The dockboard includes a ramp, and the side edges of the ramp are pivotally connected to guide members which ride in guideways extending upwardly in spaced relation from the dock. A counterbalancing system is employed to counterbalance the weight of the ramp and urge the ramp either to the upper stored position or to a lower operating position.

Figure 5:
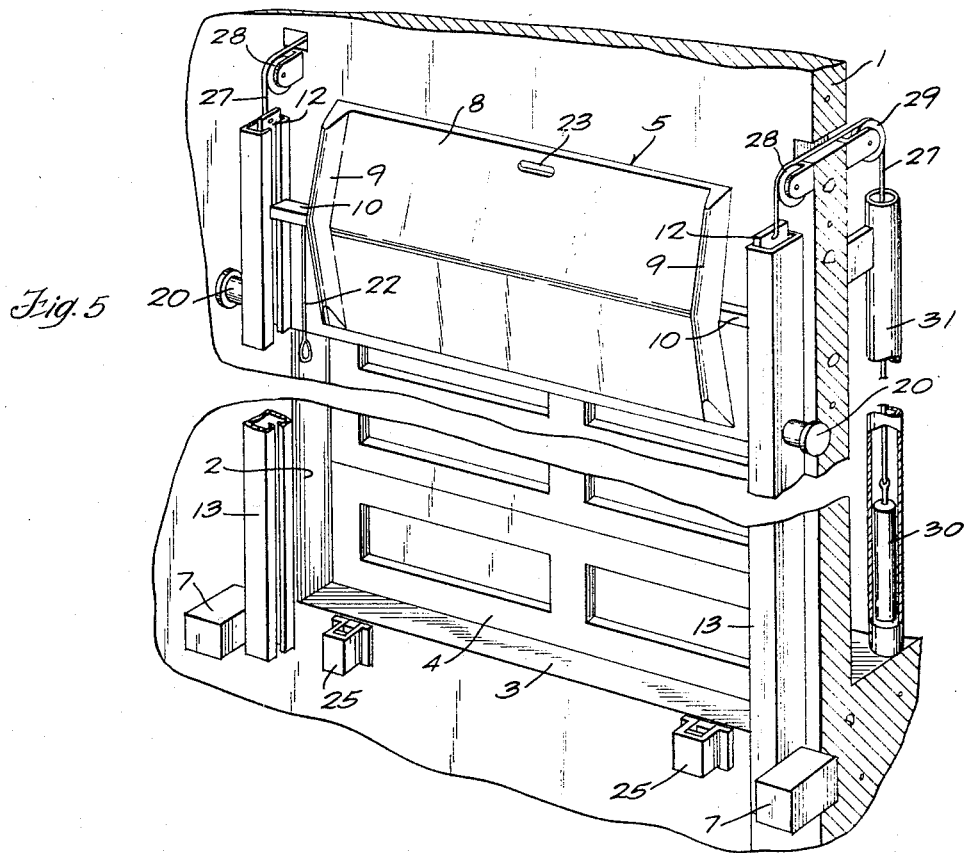

To move the ramp from the upper stored position to the operating position, the ramp is initially lowered to a position where the lower edge of the ramp is above the level of the bed of a carrier located in front of the dock and the ramp is pivoted to a horizontal position. The ramp is then lowered further to the operating position where the ramp bridges the gap between the bed of the carrier and the dock.

---

The invention is directed to an adjustable dockboard which can be installed with existing docks without alteration of the dock.

One common form of dockboard includes a ramp which is mounted flush with the upper surface of the dock and the rear edge of the ramp is hinged to the dock. When it is desired to load or unload a truck or other carrier, a holding mechanism is released through manual operation of a cable causing a counterbalancing system to pivot the ramp upwardly, and simultaneously an extension lip on the front of the ramp is also pivoted outwardly. By walking outwardly on the ramp, the ramp will then pivot downwardly against the force of the counterbalancing system to bring the lip in engagement with the bed of the truck and the holding mechanism will then hold the ramp in this position in which the ramp spans the distance between the dock and the truck bed.

With this conventional type of dockboard, the dock is formed with a pit or depression to receive the dockboard so that the ramp, when in the storage position, will be flush with the upper surface of the dock and will not interfere with cross traffic. With a new dock installation the pit necessary to receive the dockboard can be readily formed in the dock, but with existing docks it is necessary to rebuild the dock in order to provide the pit for the dockboard.

Another type of dockboard is described in the copending application Ser. No. 580,347, filed Sept. 19, 1966, and entitled Dockboard. The dockboard of that patent application includes a ramp which is stored vertically adjacent the front surface of the dock. The ramp can be lifted upwardly to a position where the lower edge of the ramp is above the level of the bed of the carrier or truck and the ramp is then pivoted to a generally horizontal position. The ramp is then lowered downwardly until the rear edge of the ramp engages the dock and the front edge of the ramp engages the bed of the truck. This type of dockboard has the advantage of being relatively inexpensive and it can be installed with existing dockboards without alteration or modification of the dock.

The present invention is directed to an improvement to the dockboard described in the above-mentioned copending patent application Ser. No. 580,347, filed Sept. 19, 1966. According to the invention, the dockboard includes a ramp which is stored vertically alongside the wall of a building bordering the loading dock and is preferably stored above the top of the loading doorway in the building wall. More specifically, the side edges of the ramp are pivotally connected to guide members which are movable within guideways mounted on the wall of the building alongside the doorway. The weight of the ramp is counterbalanced so that the ramp can be manually lowered from the storage position to a position where the lower edge of the ramp is slightly above the level of the bed of the truck or carrier. The ramp is then pivoted to a generally horizontal position and moved downwardly until the rear edge of the ramp engages the dock and the front edge of the ramp engages the bed of the truck.

Because the guide members are freely movable within the vertical guideways, the ramp is readily adjustable to any relative height between the dock and the bed of the carrier. Moreover, the ramp will automatically adjust itself to variations in height caused by raising or lowering of the bed of the truck, due to an increase or decrease of weight on the truck bed.

After the truck has been loaded or unloaded, the truck merely pulls away from the dock and due to the fact that the ramp is nose heavy or biased downwardly, the ramp will pivot to a generally vertical position. The ramp can then be moved vertically upward to the storage position and a locking mechanism is provided to lock the ramp in the upper storage position.

The dockboard is a relatively inexpensive unit which can be installed with existing docks or loading platforms without any alteration or modification of the dock. It is not necessary to reconstruct the dock to provide a pit for the dockboard, for the entire unit is mounted on the wall of the building bordering the doorway. Moreover, the dockboard length and width is not limited to the height of the dock in relation to the driveway approach, and the only limiting factor as to the dockboard length would be the height of the building wall or the presence of obstructions on the wall, such as canopies or the like. On relatively low height buildings, the guideways can extend upwardly beyond the top of the building so that the dockboard can be stored above the doorway.

As a further advantage, the guide mechanism and counterbalancing unit are located above dock level rather than being located in front of the dock, and this eliminates any possibility of damage to the units by virtue of the truck or other carrier backing into the same.

The entire dockboard, when in the storage position, is usually located above the doorway where it will not interfere with cross traffic along the dock. However, in some instances the dockboard can be stored with its lower edge resting on the dock and, if locked in this position, the dockboard provides additional security from illegal entry through the doorways at the dock area.

Other objects and advantages will appear in the course of the following description.

The drawings illustrate the best mode presently contemplated of carrying out the invention.

Figure 6:
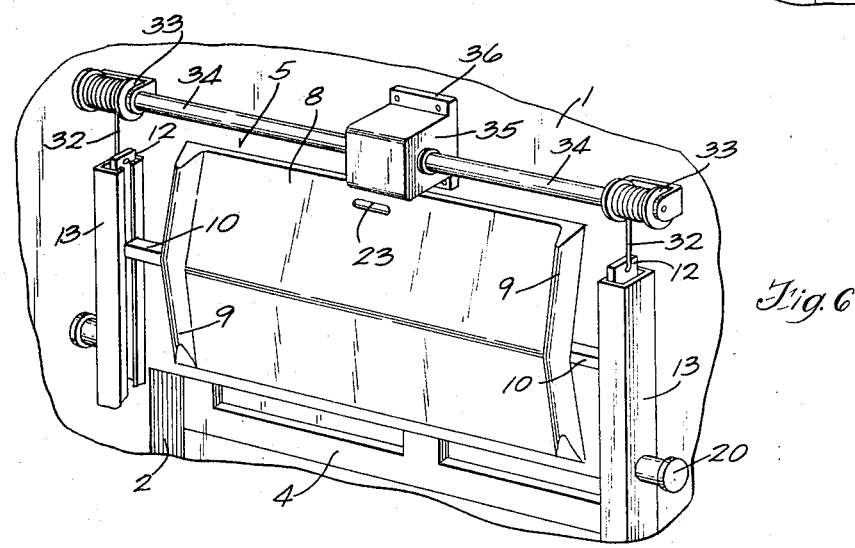

In the drawings:
FIG. 1 is a perspective view of the dockboard of the invention as associated with the loading dock;
FIG. 2 is a vertical section showing the dockboard in the upper stored position;
FIG. 3 is a view similar to FIG. 2 showing the dockboard in the operative position in which the dockboard spans the gap between the bed of a carrier and the dock;
FIG. 4 is an enlarged fragmentary vertical section showing the locking means for locking the dockboard in the upper position;

FIG. 5 is a perspective view showing a modified form of the invention in which a counterweight is utilized as the counterbalancing means; and FIG. 6 is a second modified form of the invention in which a gear motor is utilized to raise and lower the dockboard.

The drawings illustrate a wall 1 of a building having a doorway 2 which defines a loading dock 3. The doorway 2 is normally enclosed by a conventional overhead door 4.

According to the invention, a dockboard 5 is stored vertically along the outer surface of wall 1 above the doorway 2 and is adapted to be lowered to a position where it will span the gap between the loading dock 3 and the bed 6 of a carrier located in front of the loading dock. Bumpers 7 are positioned on the wall of the building 1 adjacent the loading dock and are adapted to be engaged by the truck or other carrier as it is backed toward the loading dock 3.

The dockboard 5 comprises a ramp 8 and a pair of side flanges 9 extend outwardly from the side edges of the ramp 8. A tie bar 10 is secured to the under surface of the ramp 8 and projects laterally beyond the side flanges 9. To guide the ramp in vertical movement, the ends of the tie bar 10 terminate in stub shafts 11 which are journalled within suitable openings in vertical guide bars 12 that are adapted to slide within guide channels 13 mounted on the wall 1 adjacent the doorway 2. The upper ends of the guide channels extend to a position above the header of the doorway. This connection enables the ramp 8 to be moved vertically with respect to the guide channels 13 and yet permits the ramp 8 to pivot with respect to the guide bars 12.

The ramp 8, as shown in FIG. 1, is in the storage or inoperative position in which the lower edge of the ramp is disposed above the header of the doorway 2 so that the ramp will not obstruct the doorway 2, and a workman or vehicles can pass beneath the ramp. The ramp 8 is adapted to be moved downwardly to a position where the lower edge of the ramp is slightly above the bed 6 of the carrier, then pivoted to a generally horizontal position, and then further lowered to a position where the ramp will span the gap between the dock 3 and the bed 6 of the truck, as shown in FIG. 3.

To counterbalance the weight of the ramp, a counterbalancing system is employed which can either be utilized to bias the ramp upwardly or downwardly, depending upon the requirements of the particular installation. It is generally preferred to regulate the counterbalancing force with respect to the weight of the ramp so that the ramp will be biased downwardly. If biased downwardly, there will be no tendency for the ramp to move or jump upwardly when in the operating position and jarred by vehicles moving across it. To bias the ramp downwardly, the counterbalancing force is maintained slightly less than the weight of the ramp so that the ramp will descend slowly by gravity and yet the ramp can be readily raised by manually exerting a small lifting force. To bias the ramp upwardly, the counterbalancing force will urge the ramp upwards and a manual downward force must be exerted on the ramp to lower it.

Thet counterbalancing system, as shown in FIG. 1, includes a pair of cables 14 which are attached to the upper ends of the guide bars 12, and each cable is wound around a drum 15. Each drum 15 is connected to one end of a torsion spring 16, while the opposite end of each spring 16 is fixed to a bracket 17. Rods 18 are located within the springs and the drums 15. The force of the torsion spring 16 is regulated with respect to the weight of the ramp so that very little manual force is required to either lift or lower the ramp between the storage and operating positions.

As previously mentioned, it is preferred to counterbalance the ramp downwardly and therefore a locking mechanism is employed to lock the ramp in the upper or storage position. As shown in FIG. 4, the locking mechanism may take the form of a detent 19 which is mounted within a sleeve 20 attached to the channel 13. The detent 19 is biased inwardly by a spring 21. In its inwardly biased position, the detent 19 is in the path of travel of the guide bar 12 and as the ramp 8 is moved upwardly to the storage position, the upper end of the guide bar 12 will ride over the detent and subsequently the detent will be urged the locking position beneath the lower end of the guide bar 12 to maintain the ramp in the upper or storage position.

To aid in lowering the ramp from the storage position to the operating position, a rope 22 or other device can be attached to the ramp or the tie bar so that the operator can readily pull the ramp downwardly. By pulling downwardly on the rop 22 the lower ends of guide bars 21 will ride against the locking detents 19, moving the detents outwardly to an unlocked position so that the guide bars 12 and ramp 8 can be lowered. After the locking mechanism has been released, the ramp, if biased downwardly, will descend slowly by gravity to the lower vertical position where the operator can pivot it to the horizontal position. The upper edge of the ramp, as shown in FIG. 1, is provided with a hand opening 23 so that the operator may conveniently pivot the ramp between the vertical and horizontal positions and also lift the ramp upwardly when it is desired to move the ramp from the operating to the storage position.

As the ramp, during service, is subjected to considerable fore-and-aft shock loads caused by a lift truck or other vehicle moving over the ramp, a provision is made to absorb this shock load. As best shown in FIGS. 2 and 3, a pair of pins 24 are pivotally connected in spaced relation to the tie bar 10. As the ramp, after being pivoted to the horizontal position, is moved downwardly, the pins 24 are received within generally U-shaped brackets 25 attached to the wall 1 below the loading dock 3. The brackets 25 are lined with a resilient, shock-absorbing material 26, such as rubber, plastic, or the like. The engagement of the pins 24 with the backets 25 prevents the ramp from moving in a fore-and-aft direction, but also aids in absorbing impact resulting from a lift truck or other vehicle across the ramp.

As previously mentioned, the ramp 8 is stored in a vertical position above the doorway 2, with the lower edge of the ramp being located slightly above the header of the doorway. In operation, the truck or other carrier backs toward the dock until the bed 6 of the truck engages the bumpers 7. In this position, the load at the end of the truck is removed, if the truck is unloading, and after removal of the end load, the operator pulls down on the rope 22 to lower the ramp to a position where the lower edge of the ramp is slightly above the bed of the carrier. The operator then pivots the ramp to a generally horizontal position and the ramp is then lowered further until the forward edge of the ramp engages the bed 6 of the carrier.

As the ramp is pivotally attached to the guide bars 12, and as the guide bars are freely slidable within the channels 13, the ramp 8 can accommodate substantial variances in height between the dock 3 and the bed 6 of the carrier, and the ramp can also adjust its vertical position as the bed of the truck may raise and lower during the loading operation. If, for example, the truck is unloading the bed of the truck may raise slightly as the load is removed, while in other cases the bed of the truck may lower, due to a loading truck moving across the bed or as an additional load is applied to the bed. In either case, the pivotal connection of the ramp 8 to the guide bars 12 and the sliding connection of the guide bars 12 within the guideways 13 enables the ramp to follow these variations in relative height of the bed.

When the loading or unloading operation has been completed, the truck merely pull away from the dock. Due to the fact that the ramp 8 is nose heavy, or the front edge is biased downwardly, the forward edge of the ramp will pivot to a generally vertical position. The operator can then grasp the handle 23 and lift the ramp upwardly to the storage position. Even if the ramp is biased downwardly, the counterbalancing force is only slightly less than the weight of the ramp so that the operator can readily move the ramp upwardly with a minimum force. When the ramp has been moved to the upper or storage position, the lower ends of the guide bars 12 will lock behind the detents 19 to thereby lock the ramp in the storage position.

As previously mentioned, the forward edge of the ramp is biased to pivot downwardly. This condition can be achieved by arranging the pivotal connection between the tie bar 10 and the ramp 8 to the rear of the midpoint of the fore-to-aft dimension of the ramp, offset from the center of gravity, so that the forward edge will pivot or tilt downwardly by gravity. A similar action can be achieved by weighting the forward edge of the ramp, or by resiliently biasing the forward edge by use of a spring or the like.

FIG. 5 illustrates a modified form of the invention in which a weight is employed as the counterbalancing force, rather than the torsion spring 16, as shown in FIGS. 1–4. In this embodiment, a cable 27 is attached to the upper end of each of the guide bars 12 and each cable is trained about a pair of sheaves 28 and 29. Sheave 28 is mounted on the exterior of the wall 1, while sheave 29 is mounted on the interior of the wall. As shown in FIG. 5, the wall is provided with an opening to receive the cable 27. Attached to the inner end of each cable 27 is an elongated weight 30 which is mounted for movement within a tubular casing 31 attached to the inner surface of the wall 1.

The weight 30 functions in a manner similar to the spring 16 and provides a counterbalancing force for the weight of the ramp 8. As previously described, the counterbalancing force can be designed to either counterbalance the ramp upwardly to the stored position or can be designed to counterbalance the weight of the ramp downwardly to the operating position.

In the structure shown in FIG. 5, the counterbalancing means is located on the inside of the building wall. This has an advantage in that the counterbalancing weight is not in a position where it could possibly be damaged by a truck backing into the wall 1. Similarly, the torsion spring 16, as shown in the form of the invention of FIGS. 1–4, could similarly be located on the interior of the wall 1 with the cables 14 extending through openings in the wall and being wound on the drums 15.

FIG. 6 illustrates a second modified form of the invention in which a power operated mechanism is employed to raise and lower the ramp 8. In this embodiment, a cable 32 is attached to the upper end of each of the guide bars 12 and the cables are secured to drums 33 which are mounted on the outer ends of shaft 34. The inner end of each shaft is operably connected to a gear motor 35 which is mounted on a plate 36 located on the outer surface of wall 1. By operating the gear motor 35 in one direction, the cables 31 are unwound from the drums 33, causing the ramp 8 to be lowered downwardly by gravity to the operating position. By reversing the operation of the motor 35, the cables 32 are wound on the drums 33 to thereby raise the ramp to the upper or storage position.

While the structure of FIG. 6 shows a gear motor designed to raise and lower the ramp, it is contemplated that any hydraulic, pneumatic or mechanical system can be employed.

The drawings have illustrated the ramp 8 being stored in a vertical position above the doorway 2. However, it is contemplated that the ramp in some instances may be stored vertically with its lower edge resting on or slightly above the surface of the dock 3. With the ramp locked in this storage position, the ramp would provide additional security from illegal entry through the doorway 2.

Storing the dockboard above dock level rather than in front of the dock 3, permits the use of longer and wider dockboards. The only limiting factor as to the dockboard length would be the height of the building wall above the doorway 2, or the location of obstruction such as canopies, overhangs, or the like above the doorway. On relatively low buildings, the guide tracks 13 could extend upwardly above the top of the building and extensions could be mounted on the upper ends of the guide tracks to support the counterbalancing assembly.

Moreover, the guide mechanism and counterbalancing means are located above the dock level, rather than in front of the dock, in a location where they cannot be damaged by a truck or other vehicle backing into the dock.

While the drawings illustrate the guide members 12 being elongated bars and riding in guide channels 13, it is contemplated that the guide members may have any desired shape or configuration and in some installations it is anticipated that the guide channels can be eliminated.

Various modes of carrying out the invention are contemplated as being within the scope of the following claims particularly pointing out and distinctly claiming the subject matter which is regarded as the invention.

I claim:

1. A dockboard to be associated with a loading dock having an upper surface, comprising a pair of fixed guides extending vertically in spaced relation above the upper surface of the dock, guide members mounted for movement with respect to said guides, a ramp having a front end and an opposite rear end and having side edges connecting said front end and said rear end, means for pivotally connecting said ramp at a location between said front and rear ends to said guide members, said guides extending a sufficient distance above the upper surface of the dock to permit said ramp to be stored vertically above the upper surface of the dock in a first upper storage position in which the front end of the ramp is below the rear end and the clearance between the front end of the ramp and the upper surface of the dock is greater than the front-to-rear dimension of the ramp so that a workman on the dock can pass under the ramp, said ramp being movable from said first vertical upper storage position to a second vertical lower position whereat the front end of the ramp will clear the bed of a carrier disposed adjacent the dock so that the ramp can be pivoted to a third generally horizontal position and lowered to a fourth cross traffic position to span the distance between the dock and the bed of said carrier, the front end of the ramp being biased downwardly so that the ramp will assume a generally vertical position when the carrier is removed from its location adjacent the dock.

2. The dockboard of claim 1 and including counterbalancing means operably connected to the ramp for counterbalancing the weight of the ramp.

3. The dockboard of claim 2, wherein said counterbalancing means is connected to said movable guide members and said counterbalancing means is arranged to bias the ramp downwardly to the second position, and said dockboard includes locking means for locking the ramp in the upper storage position.

4. The dockboard of claim 1, and including means located at the rear end of the ramp and defining a handle to be engaged by an operator to lift the ramp to the first vertical storage position.

5. In combination with a wall having a doorway therein, said doorway defining a loading dock including a loading surface spaced above ground level, a dockboard comprising a pair of vertical fixed guideways mounted on said wall on either side of the doorway, a movable guide member mounted for movement with respect to each guideway, a ramp having front and rear edges and a pair of opposed side edges connecting said front and rear edges, means for pivotally connecting the ramp at a location intermediate said front and rear edges to said guide members, said ramp being stored vertically alongside said wall with the front edge of the ramp being beneath the rear edge and being located above the doorway, said ramp being movable downwardly to a second lower vertical position in which the front edge of the ramp is at a level to clear the bed of a carrier disposed adjacent the dock to permit said ramp to be pivoted about said movable guide means to a third generally horizontal position and lowered to a fourth cross traffic position to span the distance between the dock and the bed of said carrier, means for biasing the front edge of the ramp downwardly so that the ramp will assume a generally vertical fifth position when the carrier is removed from its location adjacent the dock, and counterbalancing means for counterbalancing the weight of the ramp, said counterbalancing means being located above the level of said loading surface.

6. The structure of claim 1, and including means interconnecting the ramp and the dock for preventing fore-and-aft movement of the ramp when the ramp is in the cross traffic position.

7. The structure of claim 6, wherein said means for preventing fore-and-aft movement comprises at least one element pivotally connected to the undersurface of the ramp, and a bracket mounted on the wall beneath the level of said upper surface and disposed to receive the element as the ramp is moved to the cross traffic position.

8. The structure of claim 7, and including resilient shock absorbing means for absorbing impact forces applied to the ramp in a fore-and-aft direction when the ramp is in the cross traffic position.

9. The structure of claim 5, wherein said counterbalancing means comprises a counterbalancing member arranged to counterbalance the weight of the ramp and located on the interior of the wall, and connecting means extending through an opening in the wall and connecting said counterbalancing member and said guide member.

10. A dockboard to be associated with a loading dock having an upper surface, comprising a pair of fixed guides extending vertically in spaced relation above the upper surface of the dock, guide members mounted for movement with respect to said guides, a ramp having a front end and an opposite rear end and having side edges connecting said front end and said rear end, means for pivotally connecting said ramp at a location between said front and rear ends to said guide members, said ramp having a vertical storage position in which the front end of the ramp is located beneath the rear end and said front end is located above the level of the upper surface of the dock, said ramp being pivotable about said guide members to a generally horizontal position and being movable to a cross traffic position to span the distance between the upper surface of the dock and the bed of a carrier disposed adjacent the dock, the front end of the ramp being biased downwardly so that the ramp will assume a generally vertical position when the carrier is removed from its location adjacent the dock, means located at the rear end of the ramp defining a handle to be engaged by an operator to lift the ramp to the vertical storage position, means for retaining the ramp in the vertical storage position, and counterbalancing means for counterbalancing the weight of the ramp, the force of said counterbalancing means having slightly less than the weight of the ramp so that the ramp and guide members will be biased downwardly with respect to said fixed guides.

References Cited

UNITED STATES PATENTS

| | | | |
|---|---|---|---|
| 1,778,847 | 10/1930 | Dalin | 14—72 |
| 2,644,180 | 7/1953 | Eycleshimer | 14—72 |
| 3,027,580 | 4/1962 | Haack | 14—72 |
| 3,288,522 | 11/1966 | Norton | 14—71 XR |

JACOB L. NACKENOFF, *Primary Examiner.*